United States Patent [19]
Arai

[11] Patent Number: 4,709,147
[45] Date of Patent: Nov. 24, 1987

[54] IMAGE READING APPARATUS WHICH CALCULATES AN ORIGINAL READING DOMAIN

[75] Inventor: Hitoshi Arai, Yokohama, Japan

[73] Assignee: Canon Kabushiki Kaisha, Tokyo, Japan

[21] Appl. No.: 678,591

[22] Filed: Dec. 5, 1984

[30] Foreign Application Priority Data

Dec. 9, 1983 [JP] Japan .................................. 58-231452

[51] Int. Cl.⁴ .............................................. H01J 5/16
[52] U.S. Cl. ..................................... 250/234; 250/578; 358/293
[58] Field of Search ................ 250/234, 578; 358/213, 358/293

[56] References Cited

U.S. PATENT DOCUMENTS

| 4,327,287 | 4/1982 | Saito et al. | 250/234 |
| 4,459,619 | 7/1984 | Yoshida | 358/293 |
| 4,465,939 | 8/1984 | Tamura | 250/578 |
| 4,518,999 | 5/1985 | Kurata et al. | 358/293 X |

Primary Examiner—Eugene R. LaRoche
Assistant Examiner—James C. Lee
Attorney, Agent, or Firm—Fitzpatrick, Cella, Harper & Scinto

[57] ABSTRACT

An image reading apparatus has a CCD, a reference point on a reference plate, an image signal reading circuit, an image signal control circuit, and a CPU. When an optical element is shifted from its normal position, such a positional error can be automatically corrected without requiring readjustment of the optical element.

8 Claims, 5 Drawing Figures

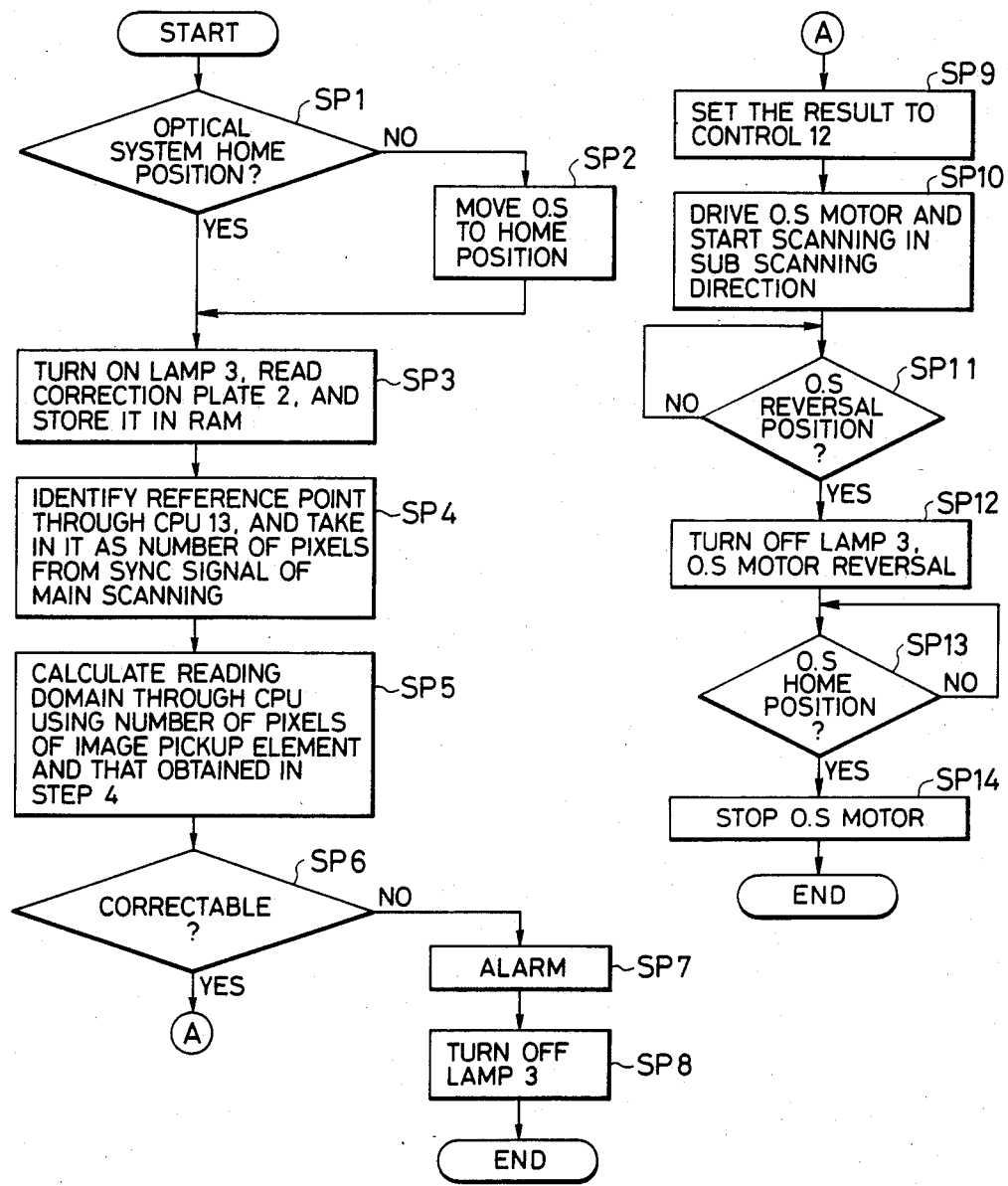

IMAGE READING APPARATUS WHICH CALCULATES AN ORIGINAL READING DOMAIN

BACKGROUND OF THE INVENTION

1. Field of the Invention

The present invention relates to an image reading apparatus which reads an original and converts image information of the original into digital image signals.

2. Description of the Prior Art

An original reading apparatus is conventionally used as an image input device for a digital copying machine or the like. This apparatus uses an image sensor such as a CCD for reading image information of an original and converts the read image information into digital signals. In an apparatus of this type, an image of the original must be formed at a predetermined position on the image sensor by moving the mounting position of the image sensor such as a CCD or the position of the optical system mirror or lens.

When such an adjustment is made, a loupe or the like is used to observe the CCD from the position of the original surface so as to correctly adjust the mounting positions of the mirror, lens and CCD. This adjustment operation has poor workability, is time-consuming, and costly. When readjustment must be effected after installation of the apparatus at a user's office or the like, the serviceability is impaired.

SUMMARY OF THE INVENTION

The present invention has been made in consideration of this and has as its object to provide an image reading apparatus which can automatically determine an original reading domain along the main scanning direction.

It is another object of the present invention to provide an image reading apparatus which can automatically correct a position error by performing a suitable and simple position correction before each image formation even if, for example, the mounting position of a CCD is slightly deviated by vibration or the like during the reading operation.

It is still another object of the present invention to provide an image reading apparatus which can effectively recognize an apparatus state improper for image reading.

The above and other objects, features and advantages of the present invention will become apparent from the following descriptions when taken in conjunction with the accompanying drawings.

BRIEF DESCRIPTION OF THE DRAWINGS

FIG. 5 is a flow chart showing an example of a sequence for controlling original scanning of the apparatus according to the present invention.

DETAILED DESCRIPTION OF THE PREFERRED EMBODIMENT

Figure 1:
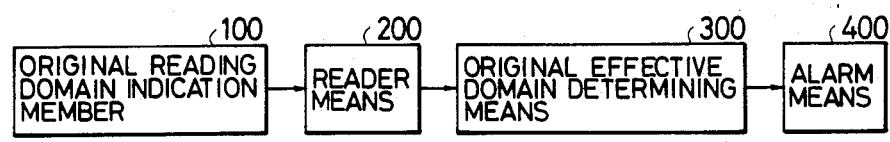
FIG. 1 is a functional block diagram showing the function of an original reading apparatus according to the present invention.

The functional block diagram of an original reading apparatus according to the present invention is shown in FIG. 1.

An original reading domain indication member 100 indicates an original reading domain and is located at a predetermined position on an original table. A reader means 200 reads a reference point of original reading from the original reading domain indication member 100. An original effective domain determining means 300 determines the effective domain of original reading with reference to the reference point information from the reader means 200. An alarm means 400 produces an alarm as needed.

The preferred embodiment of the present invention will be described with reference to the accompanying drawings.

Figure 2:
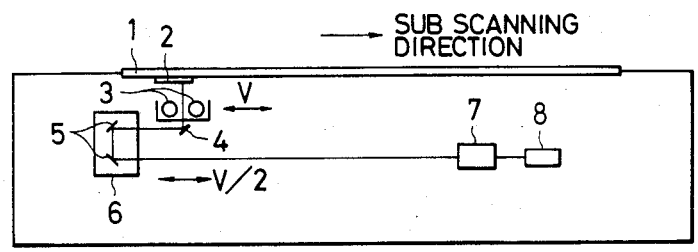
FIG. 2 is a view showing an example of the mechanical portion of an original reading apparatus according to the preferred embodiment of the present invention.

FIG. 2 is a view showing the construction of the preferred mechanical portion of an original reading apparatus according to the embodiment of the present invention.

Referring to FIG. 2, an original to be read is placed on an original table 1 with its image surface facing down. A reference plate 2 for correcting the position within a region of an original reading domain is arranged at the undersurface of the original table 1. The undersurface of the original table 1 is illuminated with light from fluorescent lamps 3. The original table 1 is scanned in the subscanning direction by an optical system motor (not shown).

The image of the original placed on the original table 1 is scanned with a known optical mechanism which has a constant optical path length. In this scanning operation, an optical unit consisting of the fluorescent lamps 3 and a reflecting mirror 4 is moved at a speed v in the subscanning direction, and another optical unit consisting of a reflecting mirror 5 and a mirror fixing table 6 is moved at a speed of v/2 in the subscanning direction. Scanning output light is guided onto a fixed line sensor such as a CCD 8 through a fixed lens 7 to read the original image.

The CCD 8 comprises about 5,000-bit photodiodes aligned in the main scanning direction and reads the original image at a resolution of about 5,000 pixels/line.

The original image read by the CCD 8 is converted into electrical signals. These signals are subjected to predetermined processing and are obtained as image signals. Details of the signal processing will be described with reference to FIG. 4.

Figure 3:
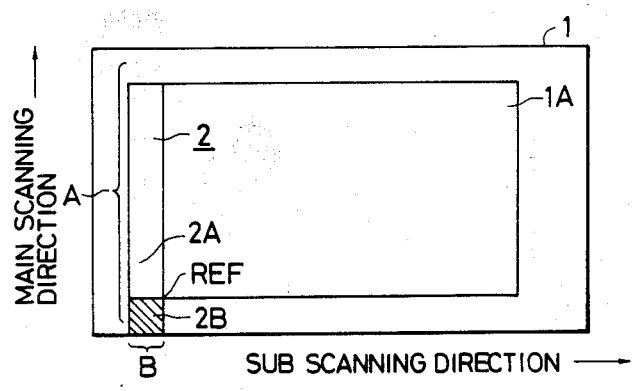
FIG. 3 is a rear view of an original table 1 shown in FIG. 2 as viewed from the lower side thereof.

FIG. 3 is a view of the original table 1 as seen from the lower side in FIG. 2.

The reference plate 2 is divided by colors into a portion 2A inside an original reading domain 1A and a portion 2B outside the domain 1A of the original table 1. As illustrated in FIG. 3, the reference plate 2 is mounted so that the boundary between the portions 2A and 2B coincides with one end of the original reading domain along the main scanning direction. The boundary between the portions 2A and 2B corresponds to a reference point REF of original reading. An effective reading domain of the original image, i.e., the region of original table 1 which will actually be scanned by CCD 8 and the optical system, taking into account positional deviations due to vibrations and the like, is determined in accordance with the reference point REF. This domain is also termed the "original reading domain" herein.

When the reference plate 2 serves also as a reference plate for shading correction, the portion 2A corresponding to the original reading domain 1A is painted white, and the portion 2B is painted black. The portions 2A and 2B of the reference plate 2 can be painted in any combination of colors if they allow discrimination between the two during original reading which will be described later. If the reference plate 2 is not used for shading correction, the portion 2A need not be painted white. Therefore, the present invention is not limited to portions 2A and 2B painted white and black, respectively.

In this original reading apparatus, after confirming that the reading position of the optical units falls within a range B of the reference plate 2 along the subscanning direction, the reference plate 2 is read. The reading domain of the reference plate 2 along the main scanning direction, i.e., the length of the portion of plate 2 that will be read in actuality, must fall within a range A which is sufficiently wider than the actual reading domain, i.e., the size of an original along the main scanning direction.

Figure 4:
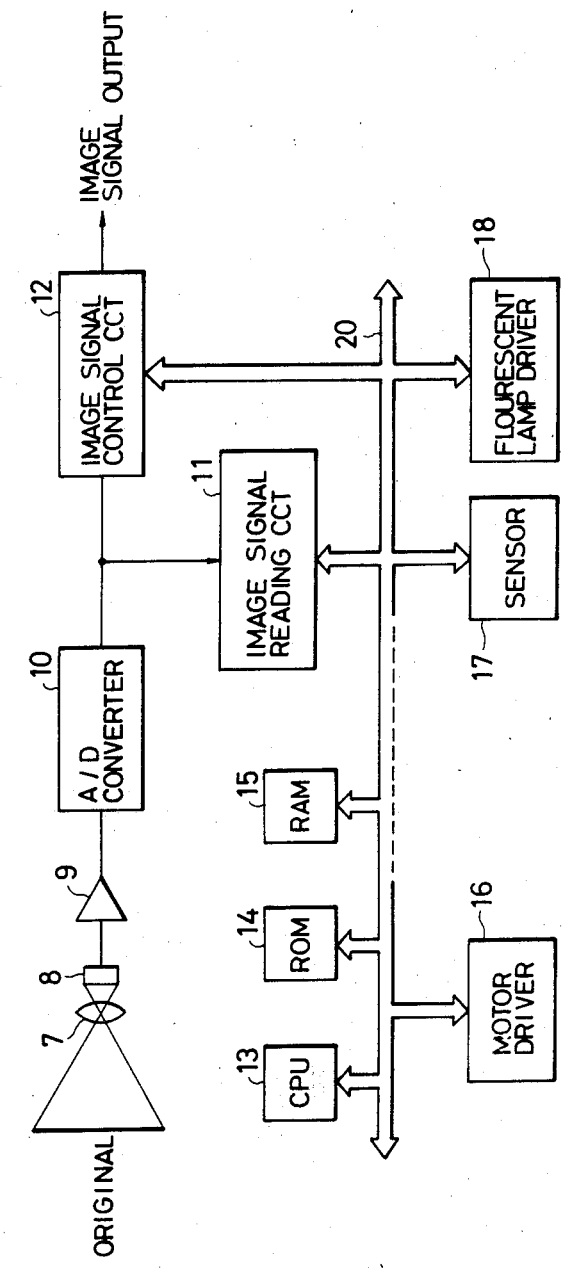
FIG. 4 is a block diagram showing the configuration of an electric circuit portion in the original reading apparatus according to the preferred embodiment of the present invention.

FIG. 4 shows the configuration of the circuit of the original reading apparatus described above.

Referring to FIG. 4, an original image formed on the CCD (image pickup element) 8 by the lens 7 is converted into an analog electrical signal representing an image density. The analog signal is amplified by an amplifier 9 and the amplified signal is supplied to an A/D converter 10. The A/D converter 10 converts the input analog signal into a digital signal of a predetermined number of bits (e.g., 6 bits; 64 gradation levels). The digital signal from the A/D converter 10 is supplied to an image signal reading circuit 11 and an image signal control circuit 12.

The image signal reading circuit 11 is controlled by a central processing unit (CPU) 13 comprising a microprocessor and supplies an image signal obtained by reading the reference plate 2 to the CPU 13.

The digital signal from the A/D converter 10 is latched in the image signal reading circuit 11 at a suitable timing. The image signal is transferred to the CPU 13 through a CPU bus 20 and is read in the CPU 13. The CPU 13 performs processing according to a sequence, a flow chart of which is shown in FIG. 5.

The image signal control circuit 12 produces only image signals from the original reading domain from among the signals read by the image signal reading circuit 11 along the main scanning direction. Thus the image signal control circuit 12 deletes unnecessary image signals. In the case of general image editing, the image signal control circuit 12 performs the same processing as a trimming function for extracting a desired image portion. Therefore, the image signal control circuit 12 can be replaced with such a trimming circuit. The image signals produced by the image signal control circuit 12 are transmitted to a printer, an electronic file or the like.

The CPU 13 executes a control program written in its read only memory (ROM) 14. The CPU 13 controls the image signal reading circuit 11, the image signal control circuit 12, a random access memory (RAM) 15, a motor driver 16, various sensors 17, a fluorescent lamp driver 18, and so on to control the overall apparatus. The motor driver 16 controls the drive operation of an optical system motor (not shown) for subscanning the optical system. The sensors 17 detect when the optical system comes to the reference position 2 or the reversal position of the optical system. The fluorescent driver 18 is used to drive and control the fluorescent lamps 3.

The control operation of the original reading apparatus according to the embodiment of the present invention will be described with reference to the flow chart shown in FIG. 5.

Referring to FIG. 5, in step SP1, before starting the reading operation, it is checked if the optical system is at the home position, i.e., a position within the range B (origin) of the reference plate 2 shown in FIG. 3. If NO in step SP1, the flow advances to step SP2 to move the optical system to the home position, i.e., to a position within the range B. When the optical system comes to a position within the range B, the flow advances to step SP3.

If YES in step SP1, the flow directly advances to step SP3. In step SP3, the lamps 3 are turned on, the reference plate 2 is read by the image signal reading circuit 11, and the image signals are stored in the RAM 15. In step SP4, the position of the reference point REF is fetched as the number of pixels from the sync signal of main scanning with reference to the read signal. In step SP5, the number of pixels read in step SP4 is used to calculate the reading domain. In step SP6, it is checked if the reading domain is correctable. If NO in step SP6, the flow advances to step SP7 wherein an alarm is generated. In step SP8, the fluorescent lamps 3 are turned off, and the flow ends. The alarm may be a visual or audio alarm.

A non-correctable reading domain means that the reference point is not present at a position lying within a range corresponding to the difference between the number of pixels of the image pickup element and the effective reading pixel number. In this case, the entire area of the original image cannot be read by the image pickup element.

If YES is the determination step SP6, the flow advances to step SP9. In step SP9, the calculation result of correction range is set in the image signal control circuit 12 so that unnecessary image signals are not produced.

The calculation of the reading domain in steps SP3 to SP5 can be performed in the following manner.

The read image data of one main scanning line of the reference plate 2 is stored in the RAM 15. The data stored in the RAM 15 is then examined along the main scanning direction. Binary data of "1" or "0" is stored in the RAM 15; a signal "0" corresponds to a signal of an original reading domain and a signal "1" corresponds to a signal of the portion 2B of different color from that of the portion 2A. When the data changes from "1" to "0", the reference point REF of the original reading domain is determined. When the main scanning direction is opposite to that shown in FIG. 3, the reference point REF of the original reading domain can be determined when the data changes from "0" to "1". This position is expressed as the number of pixels (corresponding to the number of shift clocks) from the sync signal (shift start signal) of main scanning. Using this number, the CPU 13 calculates the original reading domain and sets it in the image signal control circuit 12. The case of FIG. 3 will be considered. When the number of pixels from the sync signal of main scanning to the reference point detected in the above manner is represented by K, the total number of pixels of the image pickup element 8 (CCD) is represented by N, and the effective reading domain for one scanning of the original is represented by M, the CPU calculates (N−M). The CPU compares the obtained difference with K. When K> (N−M), it is determined that reading cannot be performed. In this case, an alarm is generated and the flow ends.

However, when K< (N−M), the domain of Kth to (K+M)th pixels is set in the image signal control circuit 12. The effective reading domain M can be automatically determined by original size information, maximum size of original which can be read, or the like.

The flow advances to step SP10. In step SP10, the optical system motor is driven to move the optical units along the subscanning direction to start reading the original. During this original image reading time, the image signal control circuit 12 is controlled to produce only the Kth to (K+M)th pixels as effective pixels. In other words, the image signal control circuit 12 produces the Kth to (K+M)th pixel signals. Thus, only the effective image signals of the original are produced as image signals.

In step SP11, it is checked if the optical system has reached the reversal position along the subscanning direction. If YES is the result in step SP11, the flow goes to step SP12. In step SP12, the fluorescent lamps 3 are turned off, the optical system motor is driven, and the optical system is returned to the reading start position of the reference plate 2.

In step SP13, it is checked if the optical system has reached the reading position. When the optical system has reached the reading position, the optical system motor is stopped in step SP14.

One original reading operation is completed in this manner. When the same image is read repeatedly, reading from the second time and thereafter is performed starting from step SP10 so that the calculation steps of the effective reading domain can be omitted.

The present invention is not limited to the embodiment described above. For example, the present invention can be applied to a case wherein images read by using two CCDs are combined to obtain a single image signal. In this case, in order to automatically combine the image signals, the combining portions between the two CCD outputs overlap each other so as to draw a corresponding line on the reference plate 2. In this case, the calculation of the reading domain in step SP4 in FIG. 3 can be performed skipping the signals corresponding to the overlapping portion.

The effective reading domain need not be calculated for each original reading operation. For example, this calculation can be performed only when a new type of original must be read, a reading operation is performed a considerable period of time after a previous reading operation, or a mounting state of the CCD or the like is assumed to have changed due to relocation of the apparatus.

As has been described above, the original reading domain can be automatically read and the allowance for error adjustment along the main scanning direction during assembly is increased. Therefore, the assembly operation is facilitated, the assembly time can be greatly shortened, and the assembly cost can be decreased. In addition, need for readjustment of the apparatus after installation arises less frequently. Even if the optical system or CCD is slightly shifted from the normal mounting position, normal original reading can be performed. Furthermore if the position of the optical system or the like deviates from the normal position to such a degree that reading cannot be performed, an alarm is produced so that an erroneous reading operation will not be caused. An original reading apparatus of the present invention can therefore produce an image of good quality, allows easy readjustment, and has excellent serviceability.

In the embodiment, the reference point REF is set in the vicinity of the main scanning start position. However, the reference point can be set in the vicinity of the main scanning end position.

Although the original is subscanned by moving the optical system in the above embodiment, the optical system can be fixed in position and the original can be moved.

What is claimed is:

1. An image reading apparatus comprising:
   means for reading an image of an original by scanning the original;
   an indication member for indicating a reading reference position of said reading means along a main scanning direction;
   means for detecting the reading reference position by reading said indication member with said reading means;
   means for calculating an original reading domain of said reading means in accordance with a detection output from said detecting means and a size of an original to be read;
   control means for controlling an output from said reading means when reading the image of the original, in accordance with a calculation result of said calculating means; and
   means for displaying an indication of an occurrence of a situation in which the original reading domain calculated by said calculating means cannot be read by said reading means.

2. An apparatus acording to claim 1, wherein said control means extracts only an image output from said reading means which corresponds to the original reading domain.

3. An apparatus according to claim 1, wherein said indication member is read prior to reading of the original by said reading means.

4. An image reading apparatus comprising:
   means for reading an image of an original by scanning the original;
   an indication member for indicating a reading reference position of said reading means along a main scanning direction;
   means for detecting the reading reference position by reading of said indication member by said reading means;
   means for calculating an original reading domain in accordane with a detection output from said detecting means and a size of an original to be read; and
   discriminating means for discriminating as to whether or not the original can be read by said reading means, in accordance wiht a calculation result of said calculating means,
   wherein said discriminating means prohibits original reading when it is determined that the original cannot be read by said reading means.

5. An apparatus according to claim 4, further comprising means for displaying a discrimination result of said discriminating means.

6. An apparatus according to claim 4, further comprising means for cotnrolling an output from said reading means when reading the image of the original, in accordance with a calculation result of said calculating means.

7. An apparatus according to claim 4, wherein said indication member indicates one of a reading start position and a reading end position of the reding means along said main scanning direction.

8. An apparatus according to claim 1, wherein said indication member indicates one of a reading start position and a reading end position of said reading means along said main scanning direction.

* * * * *